United States Patent
Hayashi (10) Patent No.: US 12,482,305 B2
(45) Date of Patent: Nov. 25, 2025

(54) VEHICLE

(71) Applicant: TOYOTA JIDOSHA KABUSHIKI KAISHA, Toyota (JP)

(72) Inventor: Kazushige Hayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 18/230,922

(22) Filed: Aug. 7, 2023

(65) Prior Publication Data

US 2024/0119761 A1   Apr. 11, 2024

(30) Foreign Application Priority Data

Oct. 5, 2022   (JP) .................. 2022-160966

(51) Int. Cl.
| | |
|---|---|
| H04W 4/40 | (2018.01) |
| G06F 11/07 | (2006.01) |
| G07C 5/00 | (2006.01) |
| G07C 5/08 | (2006.01) |
| H04W 4/48 | (2018.01) |
| H04W 76/00 | (2018.01) |
| H04M 3/24 | (2006.01) |

(52) U.S. Cl.
CPC .......... *G07C 5/008* (2013.01); *G06F 11/0739* (2013.01); *G07C 5/0808* (2013.01); *H04W 4/40* (2018.02); *H04W 4/48* (2018.02); *H04W 76/00* (2013.01); *H04M 3/24* (2013.01)

(58) Field of Classification Search
CPC ... G07C 5/008; G07C 5/0808; G06F 11/0739; H04W 4/40; H04W 4/48; H04W 76/00; H04W 76/18; H04W 8/18; H04W 8/20; H04W 52/48; H04W 84/025; H04M 3/24; H04B 7/0623; H04B 1/082; H04B 1/3822
See application file for complete search history.

(56) References Cited

U.S. PATENT DOCUMENTS

| | | | |
|---|---|---|---|
| 10,951,467 B2 * | 3/2021 | Negahdar | H04L 12/4625 |
| 2016/0364921 A1 * | 12/2016 | Iyoda | H04L 67/12 |
| 2019/0385388 A1 * | 12/2019 | Suzuki | G07C 5/008 |
| 2020/0265658 A1 * | 8/2020 | Du | B66D 1/485 |
| 2021/0012588 A1 * | 1/2021 | Kwon | G07C 5/008 |
| 2022/0327036 A1 * | 10/2022 | Jiang | H04M 1/72454 |

FOREIGN PATENT DOCUMENTS

JP   2003-209631 A   7/2003

* cited by examiner

*Primary Examiner* — Andrew Wendell
(74) *Attorney, Agent, or Firm* — Oliff PLC (57) ABSTRACT

A vehicle includes an in-vehicle device and a communication device. The communication device includes a modem, is connected to the in-vehicle device, and is configured to perform wireless communication with a base station. The in-vehicle device and the communication device are configured to perform a handshake in response to power-on of the vehicle. The in-vehicle device is configured to generate diagnosis information when the handshake fails. The communication device is configured to be switchable between a first mode in which resetting of the modem according to a specific reject cause from the base station is permitted and a second mode in which the resetting of the modem according to the specific reject cause is prohibited.

6 Claims, 6 Drawing Sheets

VEHICLE

CROSS-REFERENCE TO RELATED APPLICATION

The present disclosure claims priority under 35 U.S.C. § 119 to Japanese Patent Application No. 2022-160966, filed on Oct. 5, 2022, which is incorporated herein by reference in its entirety.

BACKGROUND

Technical Field

The present disclosure relates to a vehicle including an in-vehicle device and a communication device.

Background Art

JP 2003-209631 A discloses a modem inspection device for inspecting a modem used for mobile data communication. The modem inspection device includes a reset unit for resetting the modem.

SUMMARY

A vehicle including an in-vehicle device and a communication device that is connected to the in-vehicle device and is configured to perform wireless communication with a base station may have the following configuration. That is, a handshake according to an initial sequence may be performed in response to power-on of the vehicle. Also, when the handshake fails, the in-vehicle device generates and records diagnosis information. According to this kind of configuration, when the diagnosis information is recorded, a problem in the connection between the in-vehicle device and the communication device can be detected.

If the vehicle having the configuration described above is provided with a communication device including a modem that is reset when a specific reject cause is received from a base station, the following problem arises. That is, the time period of the handshake may overlap with the time period of the modem reset. As a result, the communication of the handshake may not be established due to the reset of the modem, and the diagnosis information may be recorded in an unintended form.

The present disclosure has been made in view of the problem described above, and an object of the present disclosure is to provide a vehicle that can avoid the failure of handshake between an in-vehicle device and a communication device due to reset of a modem of the communication device.

A vehicle according to a first aspect of the present disclosure includes an in-vehicle device and a communication device. The communication device includes a modem, is connected to the in-vehicle device, and is configured to perform wireless communication with a base station. The in-vehicle device and the communication device are configured to perform a handshake in response to power-on of the vehicle (Configuration A). The in-vehicle device is configured to generate diagnosis information when the handshake fails (Configuration B). The communication device is configured to be switchable between a first mode in which resetting of the modem according to a specific reject cause from the base station is permitted and a second mode in which the resetting of the modem according to the specific reject cause is prohibited.

A vehicle according to a second aspect of the present disclosure includes an in-vehicle device and a communication device. The communication device is connected to the in-vehicle device, and is configured to perform wireless communication with a base station. The vehicle includes the configurations A and B described above. The communication device includes a modem, a SIM storing telephone number information, and a processor, and is configured to reset the modem after the power-on when a specific reject cause is received from the base station. The communication device is configured to be switchable between a first mode and a second mode. In the first mode, the processor is configured to: execute an acquisition request for requesting the modem to acquire the telephone number information from the SIM in response to a return request of the telephone number information from the in-vehicle device in the handshake; and transmit a response without the telephone number information to the in-vehicle device when the modem during the reset returns an error response to the processor. In the second mode, the processor is configured to: execute the acquisition request in response to the return request; continue the acquisition request to the modem while prohibiting a response from the processor to the in-vehicle device during the reset when the modem during the reset returns the error response to the processor; and execute the acquisition request after an end of the reset to acquire the telephone number information from the SIM via the modem, and then transmit a response with the telephone number information to the in-vehicle device.

A vehicle according to a third aspect of the present disclosure is different from the vehicle according to the second aspect in the operation in the second mode. Specifically, according to the third aspect, in the second mode, the processor is configured to: execute the acquisition request in response to the return request; and wait for a response to the in-vehicle device until a response to the acquisition request is transmitted from the modem. Also, in the second mode, the modem is configured to: when receiving the acquisition request during the reset, prohibit a transmission of the error response to the processor until the reset ends; and request the SIM to transmit the telephone number information after an end of the reset, and then transmit, to the processor, the telephone number information transmitted from the SIM.

A vehicle according to a fourth aspect of the present disclosure is different from the vehicle according to the second aspect in the operation in the second mode. Specifically, according to the fourth aspect, in the second mode, the processor is configured to: execute the acquisition request in response to the return request; and when the modem during the reset returns the error response to the processor, prohibit a response from the processor to the in-vehicle device until the in-vehicle device retransmits the return request to the processor.

According to the present disclosure, the second mode is selected in advance, and thereby the failure of the handshake between the in-vehicle device and the communication device due to the reset of the modem of the communication device can be avoided even when the specific reject cause is actually notified. This can prevent unintended diagnosis information from being recorded.

DETAILED DESCRIPTION

Hereinafter, embodiments of the present disclosure will be described with reference to the accompanying drawings. In the drawings, common elements are denoted by the same reference numerals, and redundant description thereof will be omitted or simplified.

1. Configuration Example of Vehicle

Figure 1:
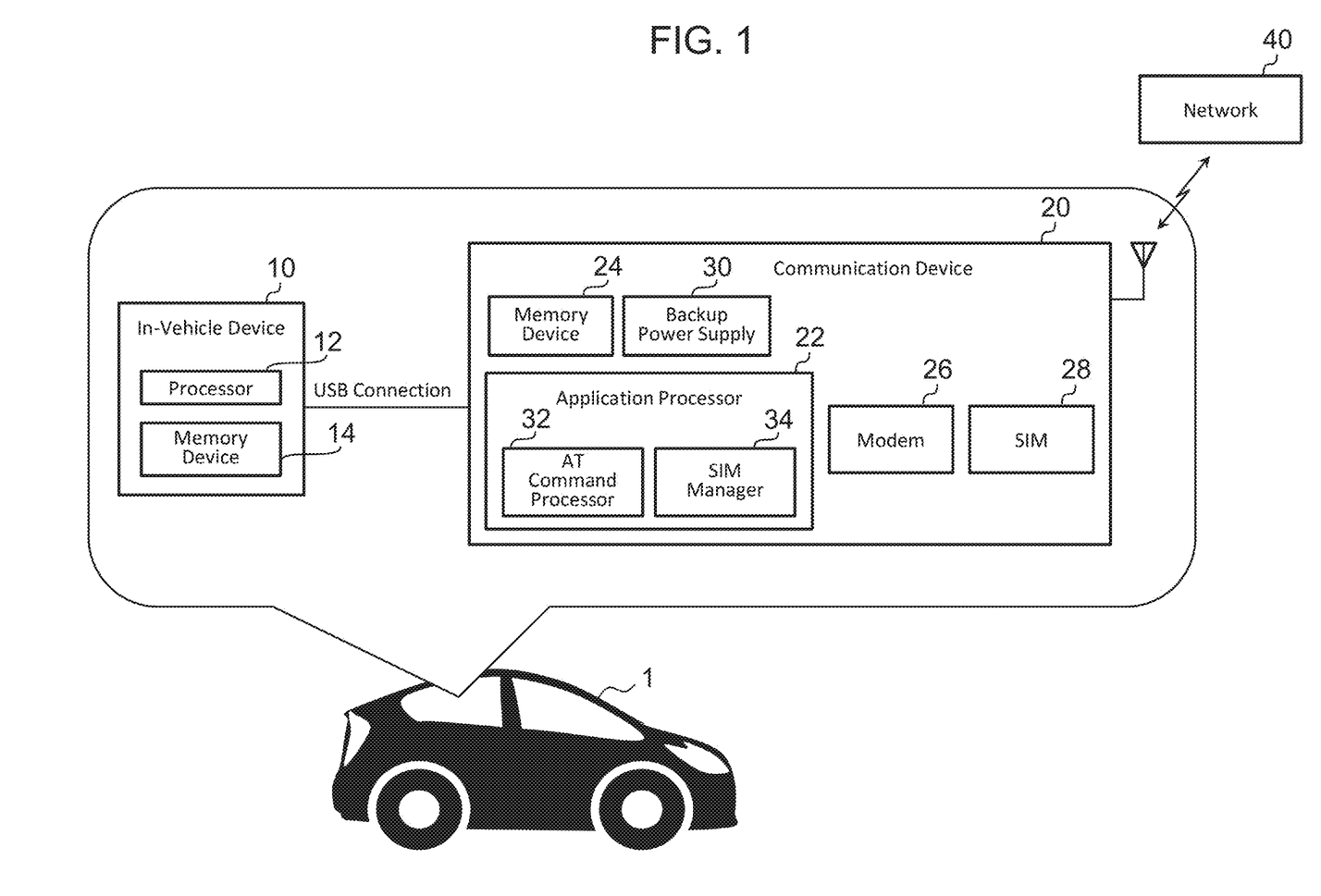
FIG. 1 is a diagram schematically illustrating an example of a configuration of a vehicle according to an embodiment.

FIG. 1 is a diagram schematically illustrating an example of a configuration of a vehicle 1 according to an embodiment. The vehicle 1 includes an in-vehicle device 10 and a communication device (in-vehicle communication device) 20.

The in-vehicle device 10 is, more specifically, an in-vehicle electronic device and is, for example, a head unit of an in-vehicle multimedia system. The in-vehicle device 10 includes a processor 12 and a memory device 14. The processor 12 is configured to execute various processes described below. For example, the processor 12 includes a central processing unit (CPU). The memory device 14 stores various types of information necessary for the various processes by the processor 12. The memory device 14 is, for example, at least one of a volatile memory, a nonvolatile memory, a hard disk drive (HDD), and a solid state drive (SSD).

The in-vehicle device 10 is connected to the communication device 20. Specifically, the connection between the in-vehicle device 10 and the communication device 20 is, for example, a wired connection such as a USB connection.

The communication device 20 is, for example, a data communication module (DCM). The communication device 20 can wirelessly communicate with a network 40 provided by a mobile communication provider with which a user of the vehicle 1 has a contract. More specifically, the communication device 20 can communicate with each base station constituting the network 40. The communication device 20 has, for example, a function of performing a communication operation via the network 40 using a telephone number assigned to the communication device 20.

Specifically, the communication device 20 includes an application processor (AP) 22, a memory device 24, a modem 26, a subscriber identity module (SIM) 28, and a backup power supply 30. The AP 22 is configured to execute various processes described below.

The AP 22 includes, for example, an AT command processor 32 and a SIM manager 34. The AT command processor 32 is configured to execute processes related to various AT commands transmitted from the in-vehicle device 10. In response to a request from the AT command processor 32, the SIM manager 34 executes a process of acquiring various information such as telephone number information from the SIM 28 via the modem 26.

The modem 26 includes a modulator for modulating information transmitted to the network 40, a demodulator for demodulating information received from the network 40, and a processor.

The SIM 28 may include an insertion portion into which a SIM card can be inserted, or may include an embedded Subscriber Identity Module (eSIM) that is installed in advance in the communication device 20. The SIM card or the eSIM stores information used to communicate with the network 40. To be specific, the information stored in the SIM 28 includes the telephone number information. The SIM 28 also includes, for example, a reader and a processor.

Furthermore, even when the communication device 20 is not supplied with electric power from a power supply (i.e., battery) of the vehicle 1, the communication device 20 is periodically activated by electric power supplied from the backup power supply 30 and performs necessary communication (for example, search for a base station) with the network 40.

2. Handshake

Figure 2:
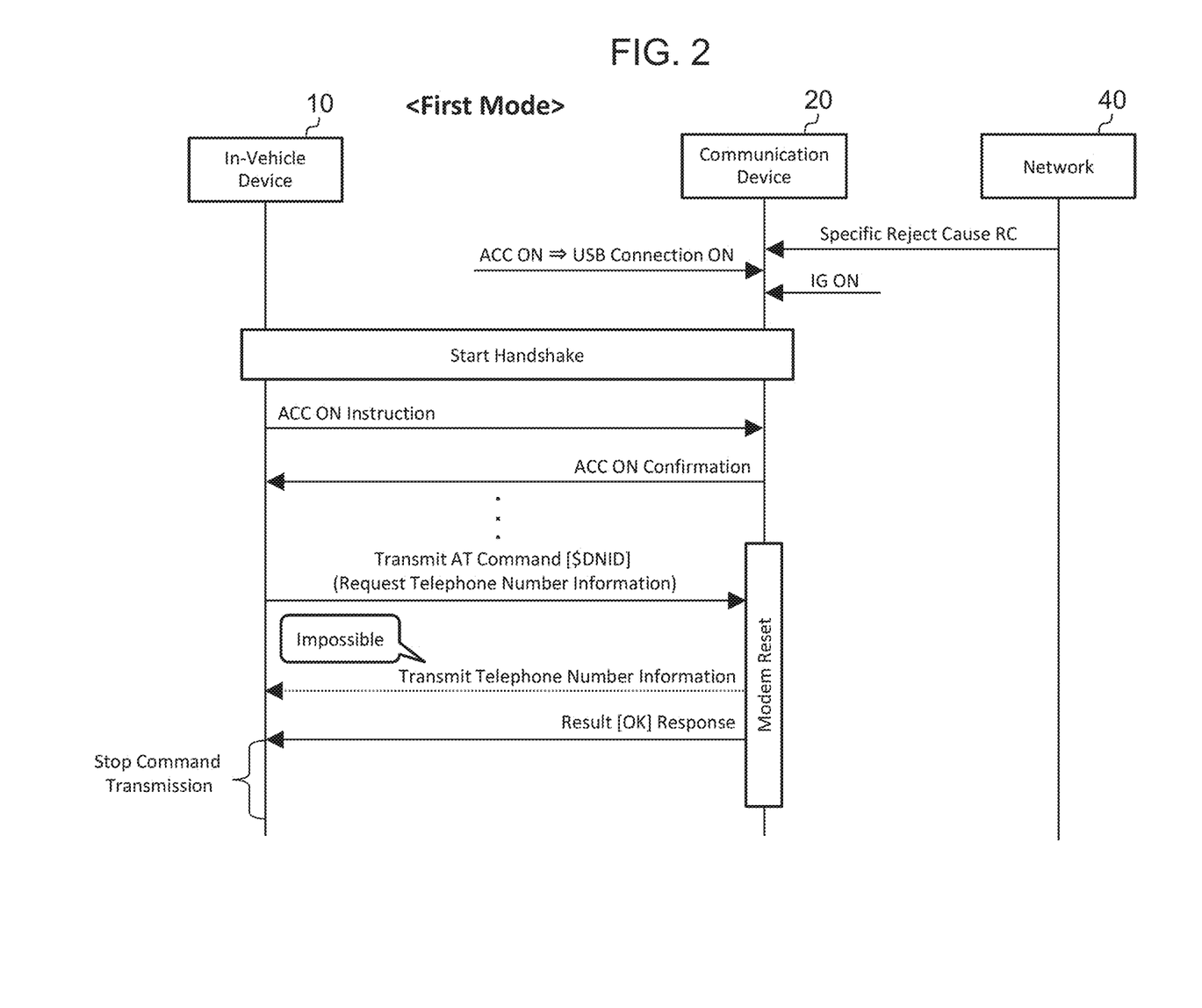
FIG. 2 is a sequence diagram used to describe an outline and a problem of a handshake performed between an in-vehicle device and a communication device.

FIG. 2 is a sequence diagram used to describe an outline and a problem of a handshake performed between the in-vehicle device 10 and the communication device 20. More specifically, the operation shown in FIG. 2 corresponds to an operation when a first mode is selected, which will be described below.

When an accessory power supply of the vehicle 1 is turned ON (ACC ON), electric power is supplied to the in-vehicle device 10 and the communication device 20. As a result, if there is no problem in the connection, the USB connection is turned ON. Then, when an ignition power supply is turned ON (IG ON) following the accessory power supply being turned ON (i.e., in response to power-on of the vehicle 1), the in-vehicle device 10 and the communication device 20 perform a designated handshake as an initial sequence before starting normal communication. More specifically, this kind of handshake is performed each time the vehicle power supply is activated.

In the handshake, first, for example, an "ACC ON instruction" notifying the communication device 20 that the accessory power supply has been turned ON is transmitted from the in-vehicle device 10 to the communication device 20. Then, from the communication device 20 that has received this instruction, an "ACC ON confirmation" indicating that the communication device 20 has confirmed that the accessory power supply is in the ON state is returned to the in-vehicle device 10. Although detailed description is omitted here, in the handshake, a predetermined number of pieces of information are exchanged between the in-vehicle device 10 and the communication device 20. One such exchange of information is an AT command [AT$DNID] shown in FIG. 2. This AT command [AT$DNID] is used by the in-vehicle device 10 to request the communication device 20 to transmit the telephone number information.

In the handshake, the in-vehicle device 10 determines whether or not the connection between the in-vehicle device 10 and the communication device 20 is correctly performed. When the handshake fails, the in-vehicle device 10 generates and records diagnosis information. The diagnosis information is generated as, for example, information indicating the disconnection of a USB cable. According to this kind of configuration, when the diagnosis information is recorded, it is possible to discover that there is a problem in the connection between the in-vehicle device 10 and the communication device 20.

On the other hand, the communication device 20 is basically configured to reset and initialize the modem 26 when a specific reject cause RC is received from a base station included in the network 40 ("first mode" according to the present embodiment). The "specific reject cause RC" referred to here is a notification requesting the communication device 20 not to search for a base station. This kind of reject cause RC is notified, for example, when communication by the communication device 20 is performed when the vehicle 1 equipped with the communication device 20 conforming to the U.S. specifications (more specifically, a communication device including the SIM 28 conforming to the U.S. specifications) is produced in a Japanese factory and shipped. In other words, the reject cause RC is notified when communication by the communication device 20 for a country or region is performed in another country or region having a different communication standard (that is, outside the range of the communication device 20). In addition, the notification of the reject cause RC may be performed not only at the time of shipment from the factory but also, for example, at the time of communication when the contract for the communication service using the communication device 20 is canceled by the user of the vehicle 1. It should be noted that the reason why the communication device 20 resets the modem 26 when receiving the reject cause RC is to try to search for another base station.

Here, the communication device 20 may communicate with the network 40 (i.e., base station) using the backup power supply 30 before the vehicle power supply is activated, for example, in order to search for a base station. When this kind of communication is performed, the communication device 20 may receive a specific reject cause RC as illustrated in FIG. 2. When the reject cause RC is received in this manner, the resetting of the modem 26 is performed after the activation of the vehicle power supply (i.e., after IG ON) as shown in FIG. 2. Therefore, the time period of the reset of the modem 26 performed due to the communication before the activation of the vehicle power supply overlaps with the time period of the handshake performed in association with the activation of the vehicle power supply. In addition, the time period of the reset includes a time period required to initialize the modem 26.

FIG. 2 illustrates a situation in which the time period of the reset of the modem 26 and the time period of the handshake overlap as described above. When the modem 26 is reset during the time period of the handshake in this manner, the communication device 20 cannot make a response expected by the in-vehicle device 10, and the handshake fails. In other words, the handshake communication is not established. As a result, the in-vehicle device 10 generates the above-described diagnosis information (for example, information indicating the disconnection of the USB cable) and records the generated diagnosis information in the memory device 14.

To be more specific, as shown in FIG. 2, when the AT command [AT$DNID] (i.e., a request for the telephone number information) is transmitted from the in-vehicle device 10 to the communication device 20 while the modem 26 is being reset, an error response is made from the modem 26 to the AP 22 (SIM manager 34). That is, the AP 22 cannot acquire the telephone number information from the SIM 28. Therefore, as shown in FIG. 2, the communication device 20 (AP 22) cannot return the telephone number information to the in-vehicle device 10. Details of this kind of operation are shown in the upper part of FIG. 4, which will be described below. More specifically, in the example of the operation illustrated in FIG. 2, the communication device 20 (AP 22) cannot return the telephone number information and returns only a result code of "OK response". When only the result code of "OK response" is returned as described above, the in-vehicle device 10 waits for the return of the telephone number information from the communication device 20 until a designated time (for example, 90 seconds) elapses from the transmission time point of the AT command [AT$DNID]. Then, when the designated time elapses without the return of the telephone number information, the in-vehicle device 10 generates the diagnosis information described above and records the generated diagnosis information in the memory device 14.

The failure of the handshake caused by the reset of the modem 26 as described above does not indicate that there is a problem with the connection itself between the in-vehicle device 10 and the communication device 20. In other words, the recording of the diagnosis information is performed in an unintended manner at the time of the failure. However, for example, in a situation in which the diagnosis information is recorded due to the reset of the modem 26 in the handshake performed in association with the activation of the vehicle power supply in the inspection at the time of factory shipment of the vehicle 1, there is a possibility that the vehicle 1 may be erroneously recognized as an inspection nonconformity and may proceed to the reinspection.

Additionally, "Stop command transmission" in the example of the operation shown in FIG. 2 means that the in-vehicle device 10 stops transmission of commands following the AT command [AT$DNID] because the result code of "OK response" is returned from the communication device 20 to the in-vehicle device 10. In addition, in the handshake, commands other than the AT command [AT$DNID] are communicated between the processor of the in-vehicle device 10 and the AP 22, and thus can be executed regardless of whether or not the modem 26 is being reset.

In view of the problem described above, in the present embodiment, the communication device 20 is configured to be switchable between a "first mode" in which resetting of the modem 26 according to a specific reject cause RC from a base station is permitted and a "second mode" in which the resetting of the modem 26 according to the reject cause RC is prohibited. Mode information indicating whether the current mode of the modem 26 is the first mode or the second mode is stored in the memory device 24 of the communication device 20. The switching of the mode of the modem 26 can be performed by, for example, a person operating a designated switching tool to update the mode information.

More specifically, the second mode is, for example, a mode (shipping mode) selected when the vehicle 1 is inspected before being shipped from the factory. In addition, for example, the communication device 20 may be installed in the vehicle 1 while the second mode is selected on the assumption of a handshake at the time of factory shipment. Alternatively, for example, the switching from the first mode to the second mode may be performed by a person in charge who operates the switching tool in the inspection at the time of factory shipment. Then, for example, the switching from the second mode to the first mode may be performed after the vehicle 1 is transported to a country or a region where the user of the vehicle 1 is located.

Moreover, the second mode may be selected, for example, when the user of the vehicle 1 cancels the contract for the communication service using the communication device 20.

In addition, the first mode is, for example, a basic mode that is selected when the second mode is not selected. It should be noted that the mode of the modem 26 may include one or more modes other than the first mode and the second mode.

Figure 3:
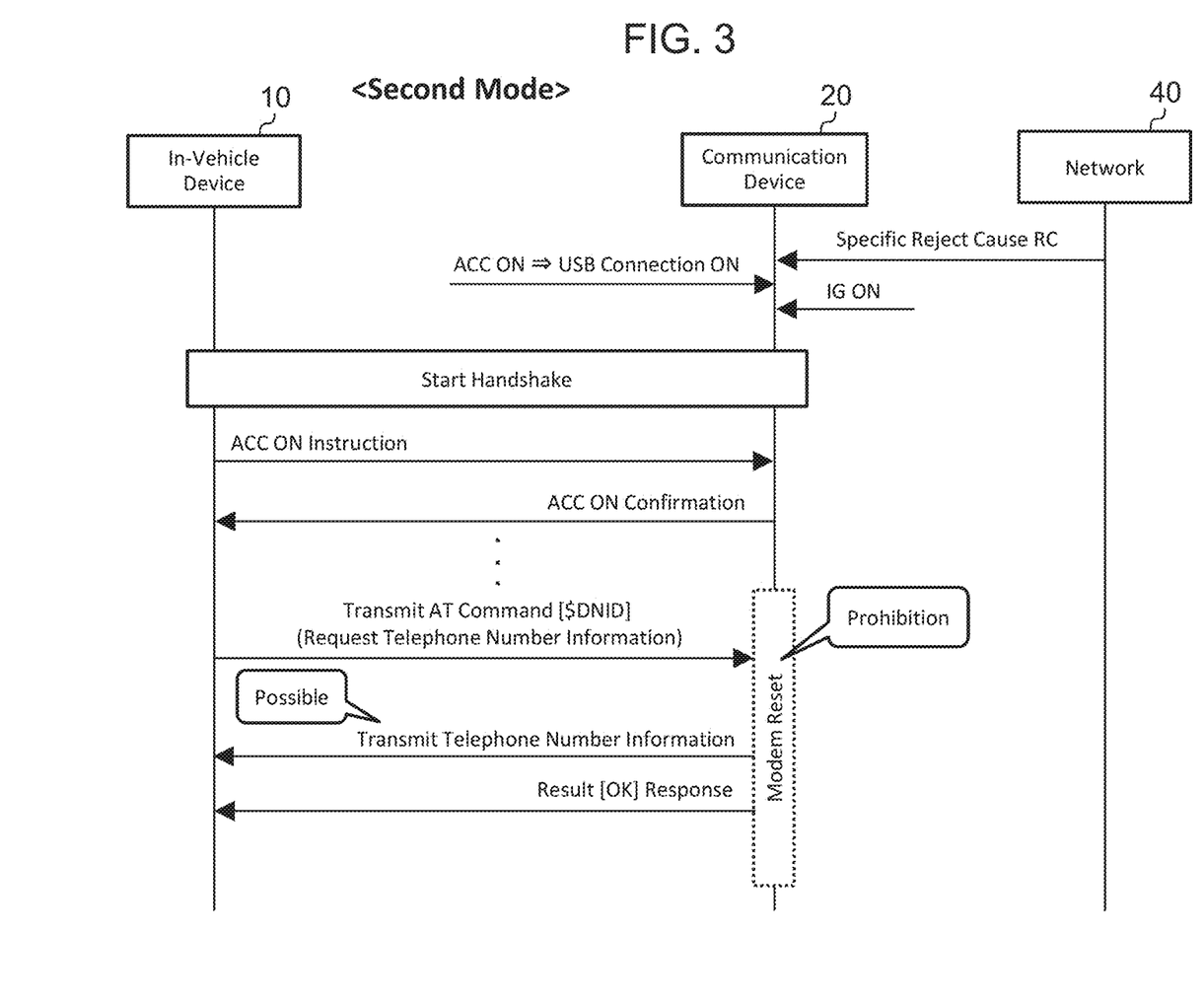
FIG. 3 is a sequence diagram used to describe an operation of the handshake performed when a second mode according to the embodiment is selected.

FIG. 3 is a sequence diagram used to describe an operation of the handshake performed when the second mode according to the embodiment is selected. This example corresponds to the "first aspect" according to the present disclosure. Similarly to FIG. 2, FIG. 3 is directed to a situation in which a specific reject cause RC is notified.

The communication device 20 (AP 22) can determine whether the current mode of the modem 26 is the first mode or the second mode based on the mode information stored in the memory device 24. If the current mode is the second mode when the vehicle power supply is activated, as shown in FIG. 3, resetting of the modem 26 according to the reject cause RC is prohibited. As a result, even when the reject cause RC is notified, the AP 22 (the manager 34) can acquire the telephone number information from the SIM 28 via the modem 26 in response to the AT command [AT$DNID] from the in-vehicle device 10 during the execution of the handshake. Therefore, as shown in FIG. 3, the communication device 20 can return, to the in-vehicle device 10, the telephone number information together with the result code of the "OK response".

As described above, according to the present embodiment, the communication device 20 is configured to be switchable between the first mode and the second mode. Therefore, the second mode is selected in advance as a mode for a situation in which a specific reject cause RC is expected to be received (e.g., for the time of factory shipment), and thereby the failure of the handshake between the in-vehicle device 10 and the communication device 20 due to the reset of the modem 26 can be avoided even when the reject cause RC is actually notified. This can prevent unintended diagnosis information from being recorded.

In addition, according to the present embodiment, when the second mode is selected at the time of shipment from the factory, an unintended diagnosis information caused by the reset of the modem 26 is not recorded. Thus, it is possible to prevent the vehicle 1 from being erroneously recognized as the inspection nonconformity due to the recording of the unintended diagnosis information.

3. Modified Examples

In order to avoid that the handshake is not established, instead of the example shown in FIG. 3, for example, any one of the following first to third modified examples may be executed.

3-1. First Modified Example (Corresponding to "Second Aspect" According to the Present Disclosure)

Figure 4:
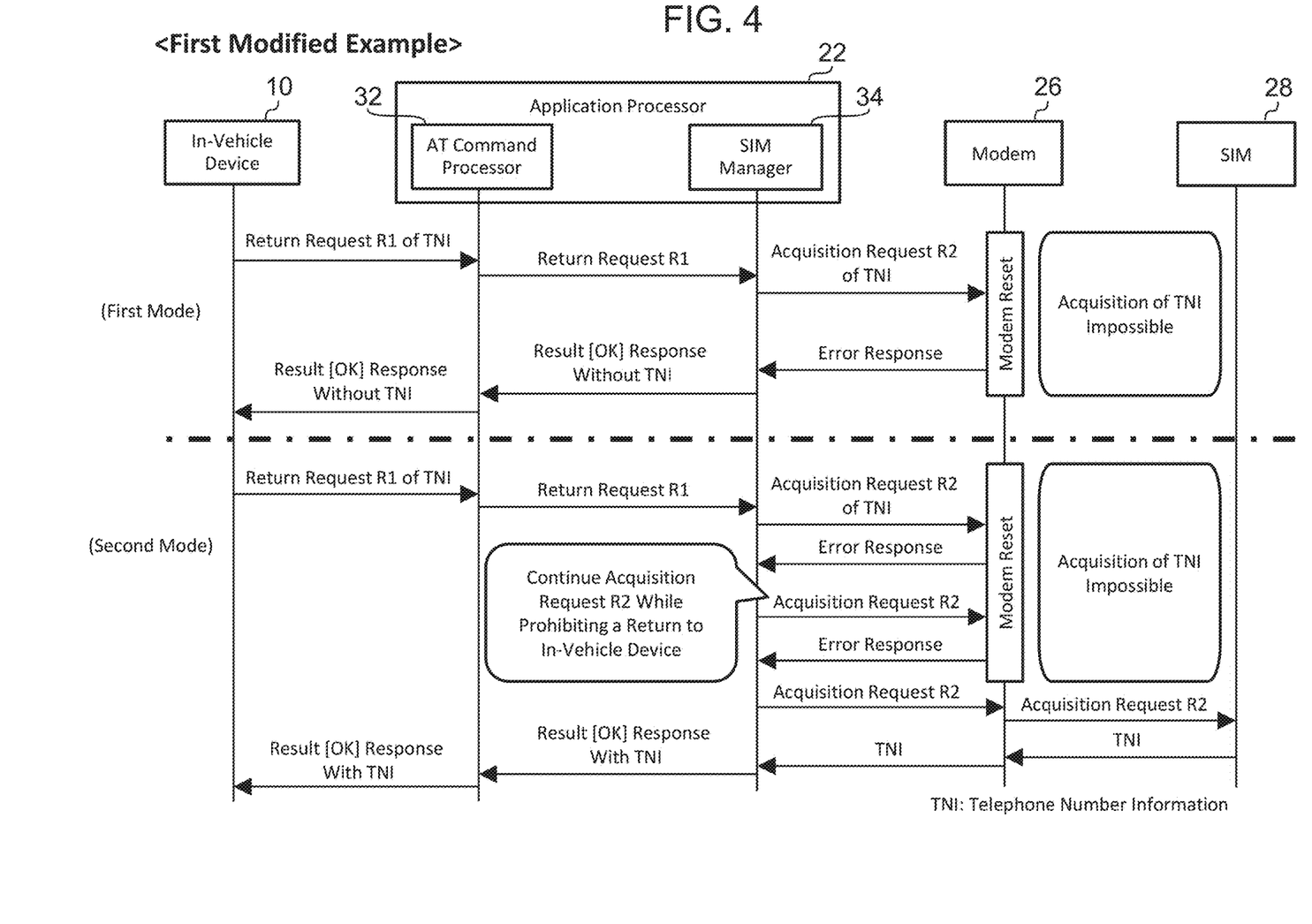
FIG. 4 is a sequence diagram used to describe an operation related to acquisition of telephone number information according to a first modified example of the embodiment.

FIG. 4 is a sequence diagram used to describe an operation related to the acquisition of the telephone number information according to the first modified example of the embodiment. More specifically, in FIG. 4, the upper part shows an operation related to the acquisition of the telephone number information when the first mode is selected, and the lower part shows an operation related to the acquisition of the telephone number information when the second mode is selected. It should be noted that, as in FIGS. 2 and 3, FIG. 4 is directed to a situation in which a specific reject cause RC is notified. Also, in response to the notification of the reject cause RC, the communication device 20 resets the modem 26 upon activation of the vehicle power supply as shown in FIG. 4. The same applies to FIGS. 5 and 6 described below.

First, in the first modified example, the operation performed when the first mode is selected is the same as the operation performed when the AT command [AT$DNID] is transmitted in FIG. 2. That is, in the first mode, the AP 22 executes an "acquisition request R2" for requesting the modem 26 to acquire the telephone number information from the SIM 28 in response to a "return request R1" (i.e., the AT command [AT$DNID]) of the telephone number information from the in-vehicle device 10 in the handshake. More specifically, the AT command processor 32 that has received the return request R1 from the in-vehicle device 10 transmits the return request R1 to the SIM manager 34. Then, upon receiving the return request R1, the SIM manager 34 transmits the acquisition request R2 to the modem 26.

However, the modem 26 that has received the acquisition request R2 cannot transmit the acquisition request R2 to the SIM 28 because the modem 26 is being reset. That is, the modem 26 cannot receive (acquire) the telephone number information from the SIM 28. As a result, the modem 26 returns an error response to the SIM manager 34. As a result, the SIM manager 34 that has received the error response from the modem 26 transmits a response without accompanying the telephone number information (i.e., only the result code of "OK response") to the AT command processor 32. Then, the AT command processor 32 transmits this response to the in-vehicle device 10.

Next, the second mode according to the first modified example will be described. Similarly to the second mode illustrated in FIG. 3, this second mode is also, for example, the mode (shipping mode) selected in the inspection at the time of factory shipment of the vehicle 1, and may be selected at the time of cancellation of the communication service by the user. The operation when this second mode is selected is different from the second mode according to the example shown in FIG. 3 in the following points. That is, as shown in the lower part of FIG. 4, the modem 26 is reset in response to receiving the reject cause RC. For this reason, the modem 26 that has received the acquisition request R2 based on the return request R1 from the in-vehicle device 10 returns an error response to the SIM manager 34 in the same manner as when the first mode is selected.

Further, in the second mode, the SIM manager 34 that has received the error response from the modem 26 continues the acquisition request R2 to the modem 26 while prohibiting the AP 22 from responding to the in-vehicle device 10 during the reset. For example, the retry of the acquisition request R2 is repeatedly executed at designated time intervals (for example, a few or several seconds). More specifically, the time required for resetting (including initialization) of the modem 26 is, for example, 6 to 10 seconds. The designated time interval related to the retry is set to be shorter than the time required for resetting the modem 26. In addition, the time required for resetting the modem 26 is shorter than a designated time for determining whether or not the in-vehicle device 10 generates the above described diagnosis information (that is, a designated time from the transmission time point of the AT command [AT$DNID]).

When the reset of the modem 26 is ended, the SIM 28 can receive the acquisition request R2 from the modem 26, as shown in the lower part of FIG. 4. The SIM 28 that has received the acquisition request R2 after the reset in this way transmits the requested telephone number information to the modem 26. The modem 26 that has received the telephone number information from the SIM 28 transmits the telephone number information to the SIM manager 34. Then, the AP 22 that has received (acquired) the telephone number information from the modem 26 cancels the prohibition of returning (replying) to the in-vehicle device 10, and transmits a response (return) including the telephone number information (i.e., the telephone number information and the result code of "OK response") to the in-vehicle device 10. More specifically, this response is transmitted from the SIM manager 34 to the in-vehicle device 10 via the AT command processor 32.

As described above, also according to the first modified example, the communication device 20 is configured to be switchable between the first mode and the second mode. Therefore, the second mode is selected in advance as a mode for a situation in which a specific reject cause RC is expected to be received (e.g., for the time of factory shipment), and thereby the AP 22 (SIM manager 34) operating as shown in the lower part of FIG. 4 can avoid the failure of the handshake even when the reject cause RC is actually notified. This can prevent unintended diagnosis information from being recorded.

3-2. Second Modified Example (Corresponding to "Third Aspect" According to the Present Disclosure)

Figure 5:
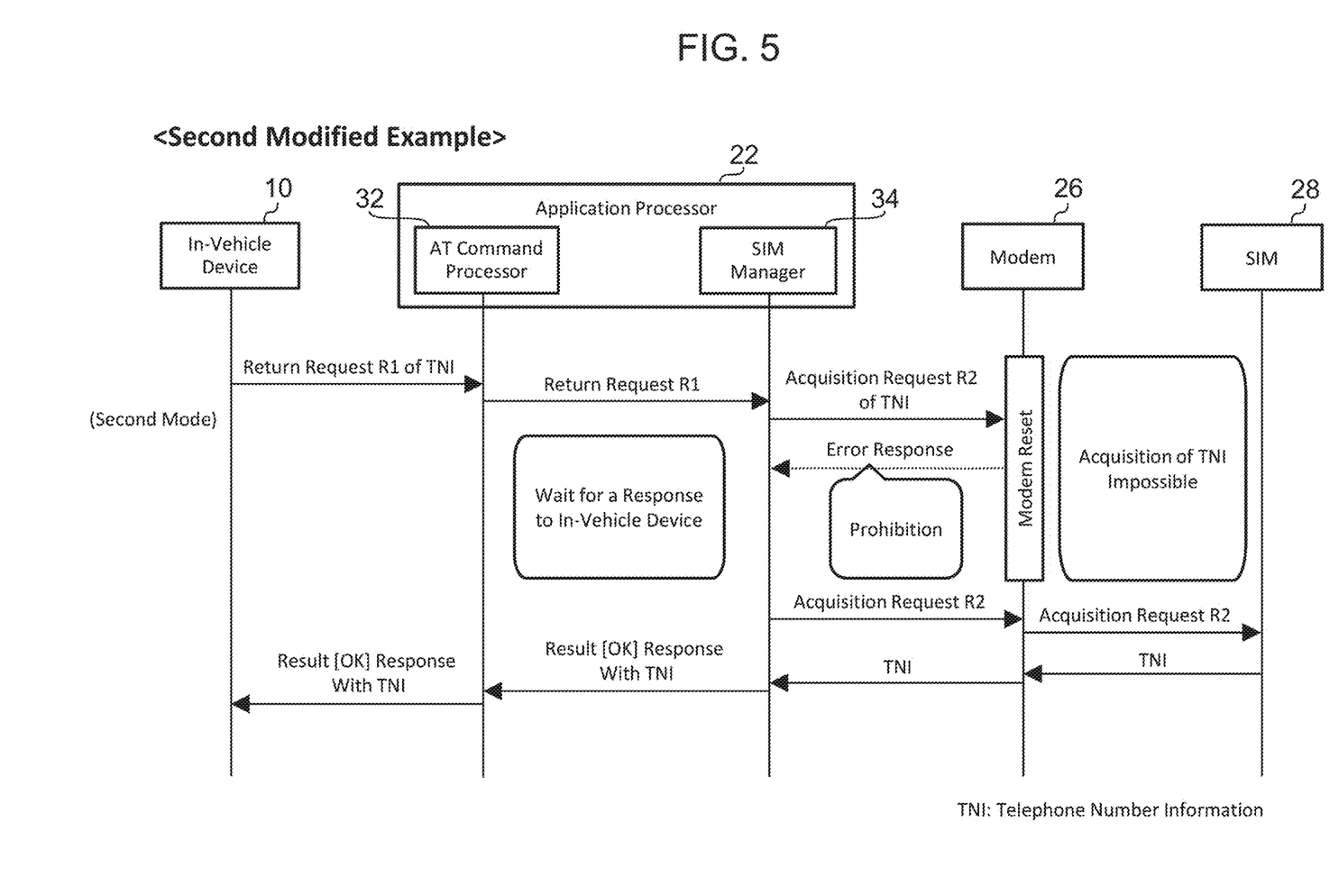
FIG. 5 is a sequence diagram used to describe an operation related to acquisition of the telephone number information at the time of selecting a second mode according to a second modified example of the embodiment.

FIG. 5 is a sequence diagram used to describe an operation related to the acquisition of the telephone number information at the time of selecting the second mode according to the second modified example of the embodiment. In the second modified example, since the operation performed when the first mode is selected is the same as that in the upper part of FIG. 4, the illustration thereof is omitted. Similarly to the second mode illustrated in FIG. 3, the second mode according to the second modified example is also, for example, the mode (shipping mode) selected in the inspection at the time of factory shipment of the vehicle 1, and may be selected at the time of cancellation of the communication service by the user.

The operation performed when the second mode is selected is different from the second mode according to the first modified example in the following points. That is, when the modem 26 receives the acquisition request R2 from the AP 22 (SIM manager 34) during the reset in response to receiving the reject cause RC, the modem 26 prohibits the transmission of the error response to the acquisition request R2 to the SIM manager 34 until the reset is ended. On the other hand, the AP 22 (SIM manager 34) waits (stands by) for a response (reply) to the in-vehicle device 10 until a response to the acquisition request R2 is transmitted from the modem 26.

When the reset is ended thereafter, the modem 26 transmits the acquisition request R2 to the SIM 28 (that is, requests the SIM 28 to transmit the telephone number information). Then, the modem 26 transmits, to the AP 22 (the SIM manager 34), the telephone number information transmitted from the SIM 28 (that is, responds to the acquisition request R2 from the SIM manager 34). The AP 22 that has received the telephone number information from the modem 26 cancels the waiting state for the response to the in-vehicle device 10, and transmits a response (return) including the telephone number information (i.e., the telephone number information and the result code of "OK response") to the in-vehicle device 10.

As described above, also according to the second modified example, the communication device 20 is configured to be switchable between the first mode and the second mode. Therefore, the second mode is selected in advance as a mode for a situation in which a specific reject cause RC is expected to be received (e.g., for the time of factory shipment), and thereby the AP 22 (SIM manager 34) and the modem 26 operating as shown in FIG. 5 can avoid the failure of the handshake even when the reject cause RC is actually notified. This can prevent unintended diagnosis information from being recorded.

The waiting (standby) of the response to the in-vehicle device 10 by the AP 22 (SIM manager 34) in the second modified example will be supplemented. During the waiting of the response, the AP 22 may determine whether or not a designated time has elapsed from the start of the waiting. This designated time is set to be longer than a time required for resetting (including initialization) of the modem 26. Also, when a response to the acquisition request R2 is not transmitted from the modem 26 within the designated time, the AP 22 may end the waiting state and transmit an error response to the in-vehicle device 10. According to this processing, when a response is not transmitted from the modem 26 to the AP 22 due to the modem 26 or the SIM 28 not functioning normally, the abnormality of the modem 26 or the SIM 28 can be notified to the in-vehicle device 10.

3-3. Third Modified Example (Corresponding to "Fourth Aspect" According to the Present Disclosure)

Figure 6:
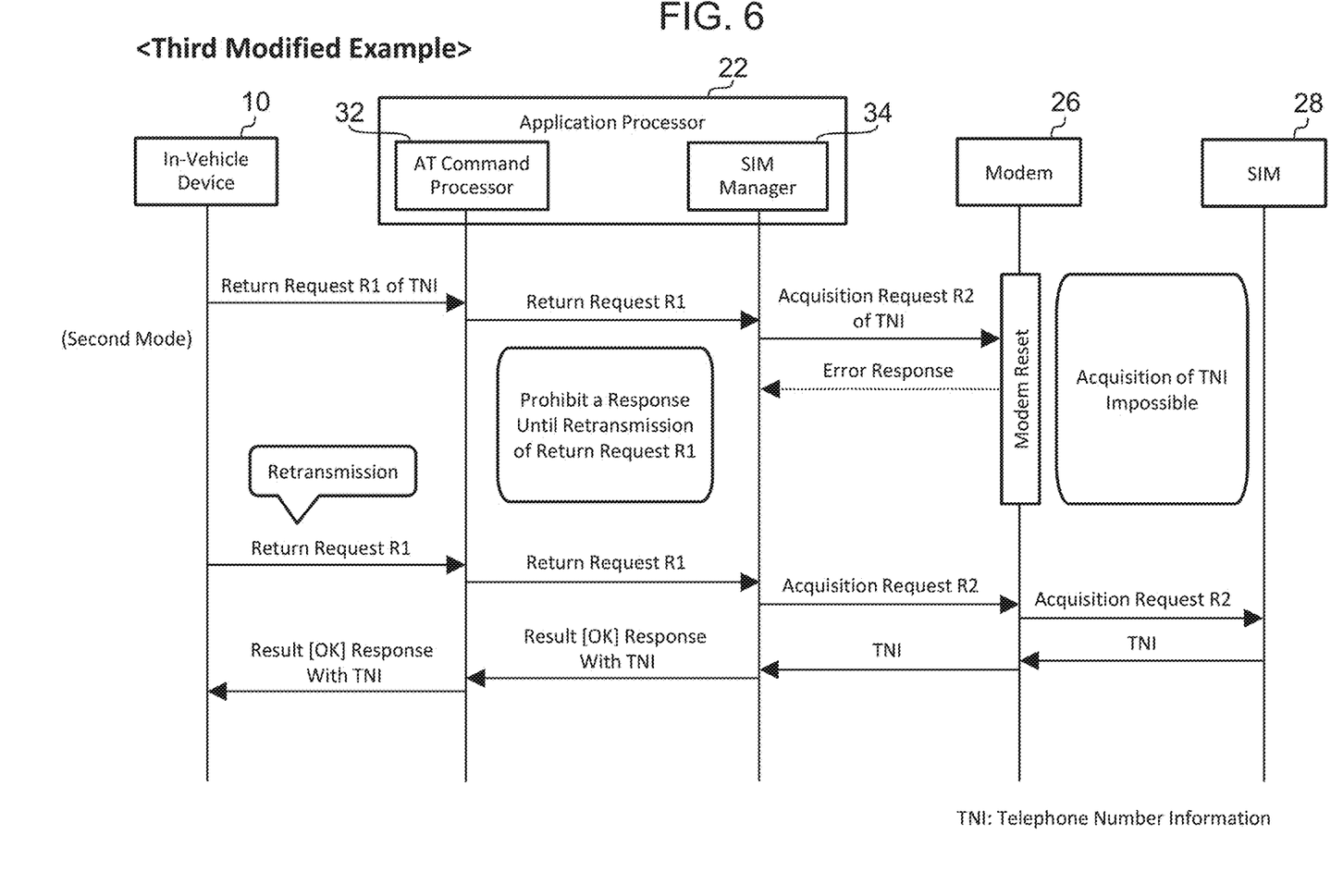
FIG. 6 is a sequence diagram used to describe an operation related to acquisition of the telephone number information at the time of selecting a second mode according to a third modified example of the embodiment.

FIG. 6 is a sequence diagram used to describe an operation related to the acquisition of the telephone number information at the time of selecting the second mode according to the third modified example of the embodiment. In the third modified example, since the operation performed when the first mode is selected is the same as that in the upper part of FIG. 4, the illustration thereof is omitted. Similarly to the second mode illustrated in FIG. 3, the second mode according to the third modified example is also, for example, the mode (shipping mode) selected in the inspection at the time of factory shipment of the vehicle 1, and may be selected at the time of cancellation of the communication service by the user.

The operation performed when the second mode is selected is different from the second mode according to the first modified example in the following points. That is, when the AP 22 (the manager 34) receives the error response from the modem 26 during the reset in response to receiving the reject cause RC, the AP 22 prohibits a response from the AP 22 to the in-vehicle device 10 until the return request R1 is retransmitted (retried) from the in-vehicle device 10 to the AP 22. In other words, the AP 22 (SIM manager 34) waits for retransmission of the return request R1 from the in-vehicle device 10.

More specifically, a time period (for example, 10 to 20 seconds) from the time point of transmission of the return request R1 made first by the in-vehicle device 10 to the time point of retransmission is set to be longer than the time required for resetting (including initialization) of the modem. 26 and shorter than a designated time for determining whether or not the in-vehicle device 10 generates the above described diagnosis information (i.e., a "designated time from the time point of transmission of the AT command [AT$DNID]").

When the return request R1 is retransmitted (retried) from the in-vehicle device 10 to the AP 22, as shown in FIG. 6, the acquisition request R2 is transmitted to the modem 26 from the AP 22 that has received the retransmitted return request R2. Then, the telephone number information transmitted from the SIM 28 in response to the acquisition request R2 from the modem 26 is transmitted to the in-vehicle device 10 via the modem 26 and the AP 22.

As described above, also according to the third modified example, the communication device 20 is configured to be switchable between the first mode and the second mode. Therefore, the second mode is selected in advance as a mode for a situation in which a specific reject cause RC is expected to be received (e.g., for the time of factory shipment), and thereby the AP 22 (SIM manager 34) operating as shown in FIG. 6 in anticipation of retransmission of the return request R1 from the in-vehicle device 10 can avoid the failure of the handshake even when the reject cause RC is actually notified. This can prevent unintended diagnosis information from being recorded.

What is claimed is:

1. A vehicle, comprising:
an in-vehicle device; and
a communication device that includes a modem, is connected to the in-vehicle device, and is configured to perform wireless communication with a base station, wherein
the in-vehicle device and the communication device are configured to perform a handshake in response to power-on of the vehicle,
the in-vehicle device is configured to generate diagnosis information when the handshake fails, and
the communication device is configured to be switchable between a first mode in which resetting of the modem according to a specific reject cause from the base station is permitted and a second mode in which the resetting of the modem according to the specific reject cause is prohibited.

2. The vehicle according to claim 1, wherein
the second mode is a mode selected in an inspection at a time of shipment of the vehicle from a factory.

3. A vehicle, comprising:
an in-vehicle device; and
a communication device that is connected to the in-vehicle device, and is configured to perform wireless communication with a base station, wherein
the in-vehicle device and the communication device are configured to perform a handshake in response to power-on of the vehicle,
the in-vehicle device is configured to generate diagnosis information when the handshake fails,
the communication device includes a modem, a SIM storing telephone number information, and a processor, and is configured to reset the modem after the power-on when a specific reject cause is received from the base station,
the communication device is configured to be switchable between a first mode and a second mode,
in the first mode, the processor is configured to:
execute an acquisition request for requesting the modem to acquire the telephone number information from the SIM in response to a return request of the telephone number information from the in-vehicle device in the handshake; and
transmit a response without the telephone number information to the in-vehicle device when the modem during the reset returns an error response to the processor, and
in the second mode, the processor is configured to:
execute the acquisition request in response to the return request;
continue the acquisition request to the modem while prohibiting a response from the processor to the in-vehicle device during the reset when the modem during the reset returns the error response to the processor; and
execute the acquisition request after an end of the reset to acquire the telephone number information from the SIM via the modem, and then transmit a response with the telephone number information to the in-vehicle device.

4. The vehicle according to claim 3, wherein
the second mode is a mode selected in an inspection at a time of shipment of the vehicle from a factory.

5. A vehicle, comprising:
an in-vehicle device; and
a communication device that is connected to the in-vehicle device, and is configured to perform wireless communication with a base station, wherein
the in-vehicle device and the communication device are configured to perform a handshake in response to power-on of the vehicle,
the in-vehicle device is configured to generate diagnosis information when the handshake fails,
the communication device includes a modem, a SIM storing telephone number information, and a processor, and is configured to reset the modem after the power-on when a specific reject cause is received from the base station,
the communication device is configured to be switchable between a first mode and a second mode,
in the first mode, the processor is configured to:
execute an acquisition request for requesting the modem to acquire the telephone number information from the SIM in response to a return request of the telephone number information from the in-vehicle device in the handshake; and
transmit a response without the telephone number information to the in-vehicle device when the modem during the reset returns an error response to the processor,
in the second mode, the processor is configured to:
execute the acquisition request in response to the return request; and
wait for a response to the in-vehicle device until a response to the acquisition request is transmitted from the modem, and
in the second mode, the modem is configured to:
when receiving the acquisition request during the reset, prohibit a transmission of the error response to the processor until the reset ends; and
request the SIM to transmit the telephone number information after an end of the reset, and then transmit, to the processor, the telephone number information transmitted from the SIM.

6. The vehicle according to claim 5, wherein
the second mode is a mode selected in an inspection at a time of shipment of the vehicle from a factory.

* * * * *